WILLIAM BEERS.

Improvement in Revolving Whiffletree Clevis.

No. 123,218. Patented Jan. 30, 1872.

Witnesses.
W. Glass
D. L. Humphrey.

Inventor.
W. Beers.
Per Burridge & Co.,
Attys 123,218

UNITED STATES PATENT OFFICE.

WILLIAM BEERS, OF MILAN, OHIO.

IMPROVEMENT IN REVOLVING WHIFFLETREE CLEVISES.

Specification forming part of Letters Patent No. 123,218, dated January 30, 1872.

*To all whom it may concern:*

Be it known that I, WILLIAM BEERS, of Milan, in the county of Erie and State of Ohio, have invented a certain new and Improved Revolving Whiffletree Clevis; and I do hereby declare that the following is a full, clear, and complete description of the same, reference being had to the accompanying drawing making part of this specification.

Figure 1:
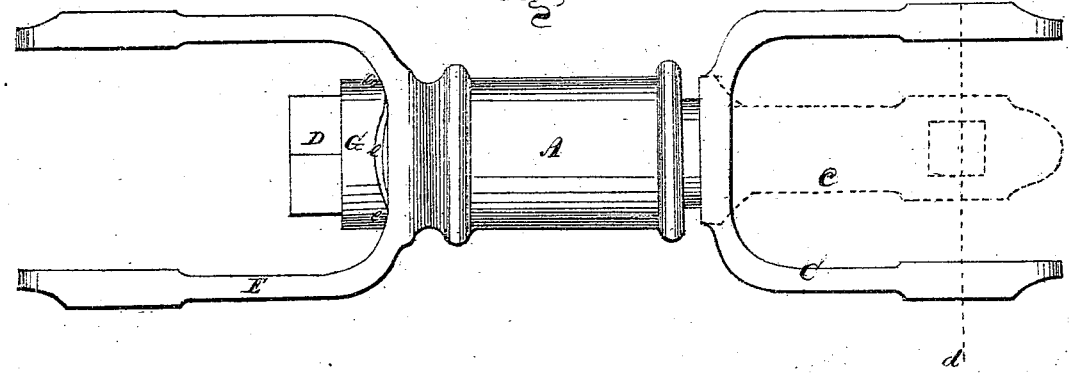
Figure 2:
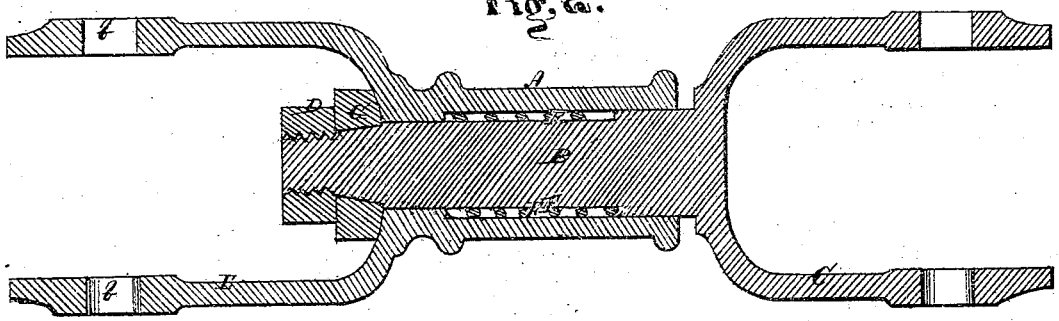
Figure 3:
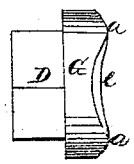

Figure 1 is a side view of the clevis. Fig. 2 is a transverse longitudinal section. Fig. 3 is a detached section.

Like letters of reference refer to like parts in the several views.

The object of this invention is to so attach the whiffletrees to the swing-box of a double-tree that they shall have a revolving movement in order that said whiffletree or single-tree may be turned to a vertical position and thereby be more out of the way when the carriage is not in use than when said single-trees are allowed to hang in a horizontal position in the usual way.

The following is a more full and complete description of the clevis.

In the drawing, Fig. 1, A represents a socket or sleeve, in which is closely but not tightly fitted the stem B of the clip C, and which is prevented from being drawn out therefrom by a nut, D, a detached view of which is shown in Fig. 3. On the end of the sleeve is formed a pair of arms or a clip, E, corresponding in size and character to the clip C. Around the stem is coiled a spring, F, the purpose of which will presently be shown. G is a cam-washer for the nut D, the inner side of which, as will be observed, is bayed, so as to form shoulders *a*, Fig. 3, making thereby the cam part of the washer.

As above remarked, this clevis is for the purpose of allowing the single-tree to be turned to a vertical position, so that it shall not be in the way when the carriage is not in use by projecting out beyond the wheels; and in order to retain the whiffletree in such vertical position is the purpose of the cam-washer and spring, the operation of which is as follows: The clip E is attached to the sway-box of the double-tree by a bolt passing through the holes *b*; whereas the single-tree is secured in the clip C in the same way. The position of the clevis when thus attached to the sway-bar and single-tree is as shown in Fig. 1, in which position the single-tree is horizontal or as when in in use. In order to turn the single-tree to a vertical position the clip C is turned partially around, thereby bringing the arms of the clevis to a horizontal position, as indicated by the dotted lines *c*, and, in consequence, the single-tree to a vertical one, as indicated by the dotted line *d*, Fig. 1. In thus turning the clevis C around, the cam-washer G is also turned therewith, which, as it turns, the shoulders *a* draw the stem B into the sleeve, but which is again forced back by the spring immediately the shoulder passes the curve of the clip, on which they slide on being turned, for the purpose aforesaid. The shoulders of the cam having passed the curve or base of the clip, the bayed part *e* of the cam comes upon the base of the clip and prevents the stem from turning unless the force exerted for that purpose upon the single-tree be sufficient to overcome the resistance of the spring.

By this simple device the inconvenience of having the ends of the whiffletrees projecting out in the way beyond the wheels of the carriage when not in use is avoided, as they can be easily turned to a vertical position and thus be out of the way.

Claims.

What I claim as my invention, and desire to secure by Letters Patent, is—

1. The clip C and stem B, in combination with the sleeve A and clip E, in the manner as and for the purpose set forth.

2. The cam-washer G and spring F, in combination with the stem B, in the manner as and for the purpose set forth.

WILLIAM BEERS.

Witnesses:
 W. H. BURRIDGE,
 D. L. HUMPHREY.